(12) United States Patent
Jin et al.

(10) Patent No.: US 8,856,247 B2
(45) Date of Patent: Oct. 7, 2014

(54) COMMUNICATING ELECTRONIC MAIL

(75) Inventors: Jian-Ming Jin, Beijing (CN); Yuhong Xiong, Mountian View, CA (US); Hui-Man Hou, Beijing (CN); Wei Liu, Beijing (CN)

(73) Assignee: Hewlett-Packard Development Company, L. P., Houston, TX (US)

( * ) Notice: Subject to any disclaimer, the term of this patent is extended or adjusted under 35 U.S.C. 154(b) by 89 days.

(21) Appl. No.: 13/258,466

(22) PCT Filed: Aug. 18, 2009

(86) PCT No.: PCT/CN2009/073314
§ 371 (c)(1),
(2), (4) Date: Dec. 27, 2011

(87) PCT Pub. No.: WO2011/020237
PCT Pub. Date: Feb. 24, 2011

(65) Prior Publication Data
US 2012/0143971 A1    Jun. 7, 2012

(51) Int. Cl.
*G06F 15/16* (2006.01)
*H04L 12/58* (2006.01)

(52) U.S. Cl.
CPC ............ *H04L 12/5855* (2013.01); *H04L 51/14* (2013.01)
USPC ........................................................ 709/206

(58) Field of Classification Search
USPC .......................................................... 709/206
See application file for complete search history.

(56) References Cited

U.S. PATENT DOCUMENTS

| | | | |
|---|---|---|---|
| 5,499,108 A * | 3/1996 | Cotte et al. ..................... 358/400 |
| 7,031,008 B2 * | 4/2006 | Oonuma ......................... 358/1.15 |
| 7,164,488 B2 * | 1/2007 | Henry ............................ 358/1.15 |
| 7,940,411 B2 * | 5/2011 | Henry et al. .................. 358/1.15 |
| 8,045,203 B2 * | 10/2011 | Henry et al. .................. 358/1.15 |
| 2002/0112184 A1 * | 8/2002 | Hall et al. ...................... 713/201 |
| 2006/0248153 A1 * | 11/2006 | Hejza Litwiller et al. ..... 709/206 |
| 2007/0237314 A1 * | 10/2007 | Henry et al. ............. 379/100.08 |
| 2008/0212144 A1 * | 9/2008 | Henry et al. .................. 358/407 |

FOREIGN PATENT DOCUMENTS

EP        1001605 A2     5/2000
WO    WO-2005086469 A1   9/2005

OTHER PUBLICATIONS

Xu Yongnan; "Method for Accessing Network in Scan Code Mode";CN 1369852; Xu Yongnan, Sep. 18, 2002; ISR and Written Opinion.

* cited by examiner

*Primary Examiner* — Brian P Whipple

(57) ABSTRACT

Proposed is the use of an email-stamp for representing an email address. By comprising information about one or more email addresses of a recipient, an email stamp may be processed in accordance with an optical recognition process so as to identify the email address of the recipient and enable an email to be automatically sent to the recipient.

15 Claims, 4 Drawing Sheets

COMMUNICATING ELECTRONIC MAIL

Electronic Mail (email) is widely used for communicating information from a sender to a recipient. However, despite the wide usage of email, it remains difficult to use for some people. For example, some people, and elderly people in particular, do not know how to maintain an address book of email address in email software. Also, for character based languages like Chinese, composing an email using a standard computer keyboard can be difficult and time consuming.

Some email systems, especially web-based systems, require a user to be online when composing email. This can problematic when access to an internet connection is restricted or expensive.

It is known to send an image via email by making an electronic image file and attaching the image file to an email as an email attachment. Thus, a person can capture an image of a paper-based document using a scanner or digital camera, save the scanned file in a computer, and attach the file to an email. This approach still requires the person to use conventional email software to send the email. Furthermore, this approach is cumbersome, as it requires the person to interact with a plurality of electronic devices and/or computer programs.

BRIEF DESCRIPTION OF THE EMBODIMENTS

Embodiments are described in more detail and by way of non-limiting examples with reference to the accompanying drawings, wherein FIG. 1 is a flow diagram illustrating a method according to an embodiment;

DETAILED DESCRIPTION OF THE DRAWINGS

Figure 1:
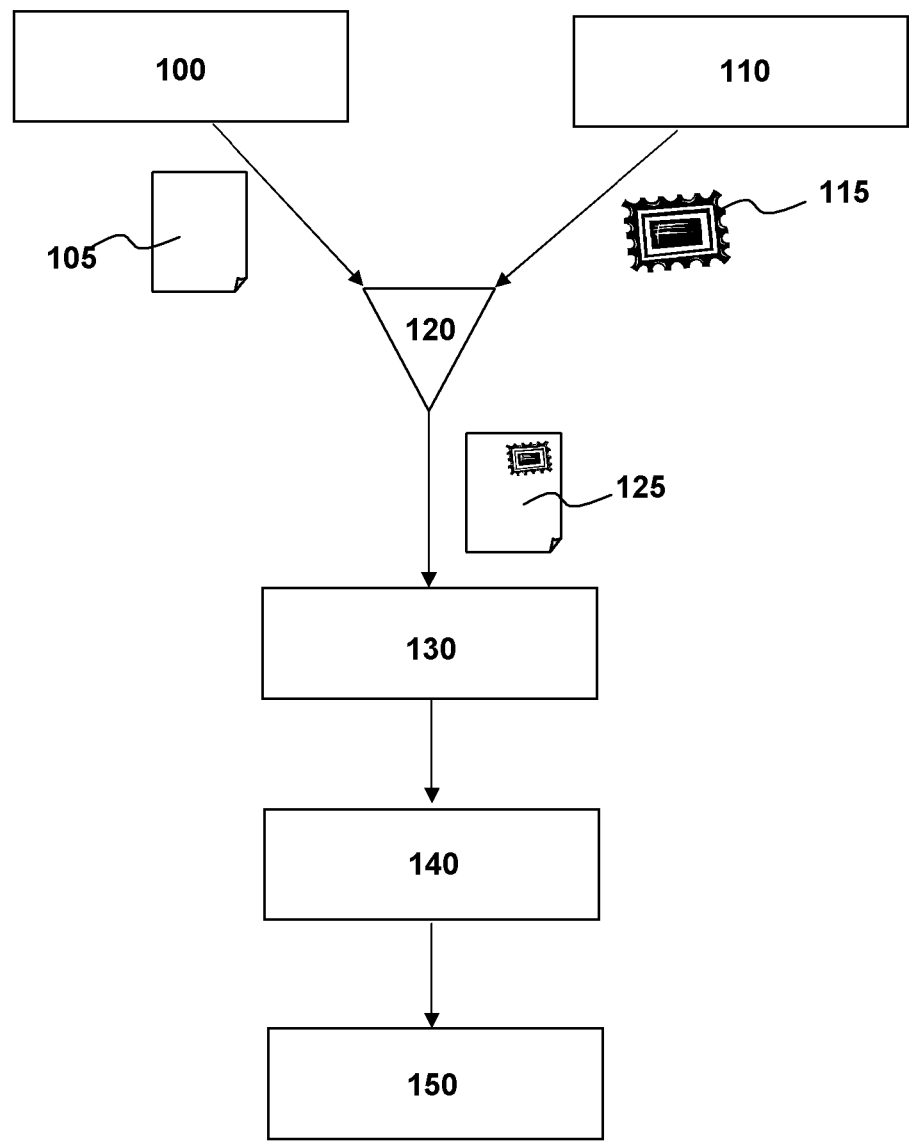

It should be understood that the Figures are merely schematic and are not drawn to scale. It should also be understood that the same reference numerals are used throughout the Figures to indicate the same or similar parts.

Proposed is the use of what is referred to as an "email-stamp" for representing the email address of a recipient. By comprising information about one or more email addresses of a recipient, an email stamp may be processed in accordance with an optical recognition process so as to identify the email address of the recipient and enable an email to be automatically sent to the recipient.

An email-stamp may comprise an image or machine readable code with embedded information about an email address or a set of email addresses. Thus, embodiments enable a user to compose a message on paper and then print or stick an email-stamp on the paper to create an email document. Using an image capture device, an electronic representation of the email document may be created and the electronic representation can then be processed using image recognition hardware/software to identify the email address(es) of the email stamp. The captured image or electronic representation can then be automatically sent to the identified email address(es) without the user needing to specify the email address(es) in email software.

For many people, writing on paper feels more natural than typing and so may be preferred method for composing a message or letter to a recipient. Embodiments enable information about a recipient's email address(es) to be combined with, printed onto, or embedded into paper, therefore allowing people to compose an email message on paper which can then be sent to an email address in a straightforward manner.

Embodiments provide an email system which enables a person to write an email message on paper, capture the message with an image capture device, and send the image as an email attachment, all without requiring knowledge of the recipient's email address(es) and/or an email program. In such a system, there are many ways in which a user may specify a recipient or his/her email address. One approach is associate an image with an email address, and use image recognition technology to identify the image and its associated email address. Alternatively, an email address may be embedded in a machine readable code which can then be added to stationery. Further, such machine readable code may be added to stationery in the form of a watermark so as to reduce the visual impact it has on the stationery. Embedding an email address as a machine readable code removes the need to store information regarding the links between an image and its associated email address(es).

A system according to an embodiment comprises the following three main components:

an email stamp generation unit for creating an email stamp;

an image capture unit for capturing an image of a document comprising an email stamp; and an email communication unit for processing the captured image to identify an email address and sending the captured image to the identified email address.

For example, the email communication unit may be a suitably arranged desktop PC, laptop, or mobile telephony device phone. The image capture unit may be a camera and scanner, and the email stamp generation unit may be a printer. Also, it is to be appreciated that any combination of these components may be integrated within a single device. For example, the image capture unit and email communication unit may be provided by a single mobile telephony device or a laptop having a webcam. Similarly, the email stamp generation unit and the image capture unit may be provided by a combined printer and scanner device.

Further, all three components may also be provided in a single device such as a combined printer and scanner device having an integrated communication unit. Accordingly, embodiments can be provided by a standalone device.

Referring now to FIG. 1, a method according to an embodiment will now be described.

Firstly, in step 100, a user composes a message to be sent to a recipient as an email. The message is composed by writing on an item of stationery, such as a piece of paper. Thus, completion of step 100 results in a physical document-105.

In step 110 an email stamp representing an email address of the recipient is generated. Here, a user associates an email address of the recipient with an image using an email stamp generation unit, which then generates an email stamp comprising the image and prints the email stamp 115 on an adhesive piece of paper.

Next, in step 120, the email stamp 115 is combined with the physical document 105 by sticking the email stamp 115 onto the document. This creates a document 125 which can be used by embodiments to automatically send the message or the document to the recipient email address represented by the email stamp 115. The document 125 created by combining the physical document 105 with the email stamp 115 may therefore be referred to as a document for transmission 125.

In step 130, an electronic representation of the document for transmission 125 is generated using image capturing means such as a scanner or digital camera. Next, in step 140, the electronic representation is processed in accordance with an optical recognition process so as to identify the email address of the recipient. The recognition process identifies the existence of the email stamp within the electronic representation of the document for transmission 125 and then determines the email address associated with the email stamp. Determination of the associated email address is, for example, undertaken by accessing data storage means which store information regarding associations between email stamps and email addresses. Alternatively, where the email stamp has been generated so as to comprise an email address (for example, by comprising a machine readable code having the email address encoded therein), the email address is determined by extracting the email address from the email stamp (for example, by decoding the machine readable code).

Finally, in step 150, the message is sent to the identified email address via a communication unit. Since the content of the message is provided by the electronic representation of the document for transmission 125 and the email address of the recipient has been identified in step 140, the message can be sent to the identified email address automatically without the user being required to compose an email and specify a recipient email address using an email program.

Three aspects of proposed embodiments will now be described separately as follows.

Email Stamp Generation

Different approaches may be used to generate an email stamp in accordance with embodiments. A first approach may be to generate an image which encodes the email address information into a machine readable format. Here, a specified email address is encoded into a certain encoded data format. Next, the encoded data is converted in a machine readable format such as a barcode image or a matrix code image. For example, QR code is a widely known 2D matrix code. It has three squares in the edge of the coded image for the decoder to determine the area and angle of code matrix. This provides a high data capacity which can encode more than 4000 alphanumeric characters, or more than 1800 Chinese characters. The code also contains data correction information generated by correction polynomial to make the code resistant to damage or dirt contamination.

An alternative approach may be to embed email address information within an existing image. This embedding approach entails a user registering an image with an email address, or set of email addresses, using an email address configuration unit. The image may be a personal photo of the email address owner, a handwritten signature, some text, a geometric figure, or any related or unrelated picture, for example. Next, an email address encoding unit encodes email address information to a certain data format. Finally, an email address embedding unit embeds the encoded data into the image using an information hiding technique such as watermarking.

There are two types of watermarking techniques: blind and non-blind watermarking. They are different in whether or not the original image is used for watermark extraction. Blind watermarking techniques may be more suitable for email stamp generation, since no information of the original image will be needed in order to extract the embedded email address information.

The coded email information can be embedded in image transformation domains such as DCT, DWT, DFT or the spatial domain. To avoid being detrimental to the visual effect of the original image, middle frequency coefficients in the frequency domain may be selected to embed watermark information.

Email Stamp Printing

After email-stamp generation, the email stamp can be printed out for future use in email sending. For example, an email stamp may be printed onto to adhesive paper so as to provide a sticker which can be stuck onto stationery. Alternatively, an email stamp may be printed onto stationery, thereby providing stationery, referred to as email-paper or email-stationary, which is adapted to be automatically sent to an email address defined by the email stamp when scanned or photographed by a device according to an embodiment.

Email Sending

To send an email, a user can write a message on a piece of email-paper, or can compose a message on normal paper and then place an email stamp on the paper. In this way, the user prepare a document for transmission 125 and an embodiment can then be used to capture and send the message to the email address of the email stamp.

Firstly, an image capture device captures an image of the document for transmission 125 and creates an electronic representation of the document 125. Next, the electronic representation is processed in accordance with an email stamp recognition process to detect all email-stamps within the electronic representation. An email-stamp decoding unit then extracts the email address information from each detected email stamp. Finally, an email communication unit sends electronic representation of the document 125 to each identified email address.

The following examples illustrate the use of particular embodiments:

EXAMPLE 1

Write Email on Email-Paper

Using a PC and a printer, an embodiment can be used to print out email-paper (i.e. paper having an email stamp printed thereon). To write an email, a user can simply write on the email-paper with the recipient's email-stamp. To send the email, the user then scans or photographs the email-paper using a scanner or camera according to an embodiment. The scanner or camera then detects the email-stamp and identifies the email address of the email stamps, and subsequently send the captured image of the email-paper to the email address.

EXAMPLE 2

Write Email on Normal Paper

A printer according to an embodiment is arranged to print email-stamps. To write an email, a user can simply write on normal paper or stationery, and then attach one or more printed email-stamps corresponding to the recipients' email address. To send the email, the user then scans or photographs the paper/stationery with the stamp(s) attached using a scanner or camera according to an embodiment. The scanner or camera then detects the email-stamp and identifies the email address of the email stamps, and subsequently send the captured image of the email-paper to the email address.

EXAMPLE 3

Grandmother Sends Email to her Grandson

A grandmother wants to sends email to her grandson, but she does not know how to configure her email software, and cannot remember her grandson's email address. In addition, she does not have someone in house to help her configure her email system.

Her grandson can solve the problem by printing out email-stamps with his email address contained therein. These can then be provided to her. The email-stamp may be a photo of the grandson, for example.

The grandmother can then simply write messages on a piece of normal paper, combine an email-stamp with the paper, and then send the message by scanning or taking a digital photograph of the paper using a scanner or digital camera according to an embodiment.

EXAMPLE 4

Grandson Sends Email-Paper to Grandmother Through Email, and Grandmother Uses Received Email-Paper to Write Email to her Grandson In the Example 3 above, the grandson can actually send an email to grandmother, with email-paper provided an attachment. This attachment can be printed out from the grandmother's printer, and the grandmother can use this email-paper to write an email to her grandson in accordance with an embodiment.

It should also be appreciated that a convention camera or scanner may be used to capture an image of a document for transmission. The captured image can then be provided to a computer or other processing device which is adapted to detect and decode an email stamp present in the image and send an email to the email address associated with the email stamp.

Figure 2:
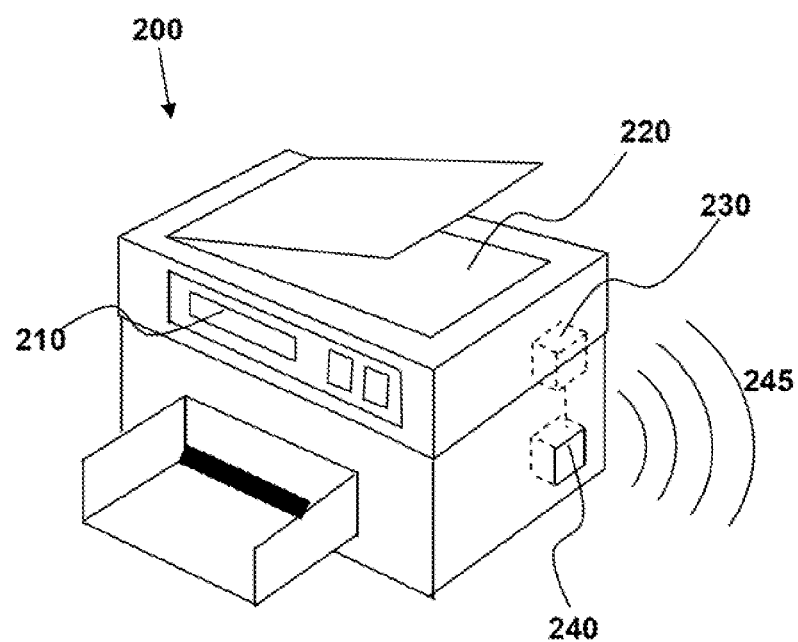
FIG. 2 shows a printer according to an embodiment.

Referring now to FIG. 2, a printer 200 according to an embodiment will now be described. The printer 200 comprises a user interface 210 adapted to receive a user input defining a recipient to which an email is to be sent. Based on this input, email stamp generation means (not visible) integrated within printer are adapted to generate an email stamp representing an email address of the recipient. The printer is adapted to print the email stamp using the conventional printing means of the printer. Such an email stamp is adapted to be processed in accordance with an optical recognition process so as to identify the email address of the recipient.

Figure 3A:
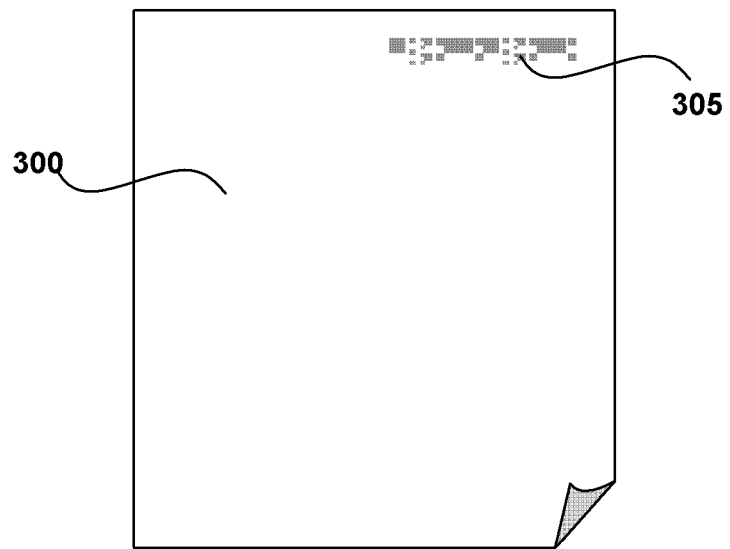
FIG. 3A shows an example of email paper 300 printed by the printer of FIG. 2.

Turning to FIG. 3A, an example of email paper 300 printed by the printer of FIG. 2 is shown. The email paper 300 comprises an email stamp 305 in the form a machine readable code. Here, a specified email address has been encoded into a machine readable format which has then been printed on a conventional piece of paper.

Figure 3B:
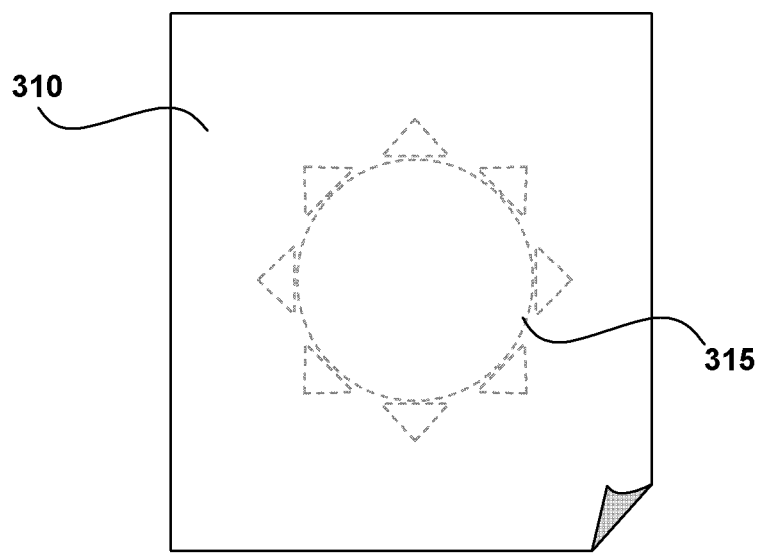
FIG. 3B shows another example of email paper 300 printed by the printer of FIG. 2.

FIG. 3B shows another example of email paper 310 printed by the printer of FIG. 2. The email paper 310 comprises an email stamp 315 in the form a watermark image having email address information embedded within the image. A user-specified image has been encoded with email address information selected by a user of the printer using a blind watermarking technique.

It will be understood that the printer of FIG. 2 can therefore provide a pre-addressed item of stationery comprising an email stamp representing an email address of a recipient. The email stamp is adapted to be processed in accordance with an optical recognition process so as to identify the email address of the recipient and instruct an email communication unit where to send the email. The pre-addressed item of stationery may comprise a message portion, such a blank area, within which information to be sent to the recipient is to be provided by a user.

Referring back to FIG. 2, the printer 200 also comprises a document scanning unit 220 adapted to scan a document placed thereon so as to generate an electronic representation of the document. The electronic representation of the document is provided to an email stamp processing unit 230 integrated within the printer 200 and adapted to detect and decode an email stamp in accordance with an embodiment.

The email stamp processing unit 230 identifies the existence of the email stamp within an electronic representation provided to it and then determines the email address associated with a detected email stamp. Determination of the associated email address is, for example, undertaken by accessing data storage means (not shown) which store information regarding associations between email stamps and email addresses. Alternatively, where the email stamp has been generated so as to comprise an email address (for example, by comprising a machine readable code having the email address encoded therein), the email address is determined by extracting the email address from the email stamp (for example, by decoding the machine readable code).

The email stamp processing unit 230 is also connected to an email communication unit 240 integrated within the printer 200. The email communication unit 240 is adapted to send emails via a wireless communication link 245, wherein the emails can contain an electronic representation of a document. The email communication unit 240 may automatically send an email to an email address provided to it from the email stamp processing unit 230. Alternatively, a user of the printer may be prompted, via the user interface, to confirm whether or not an email is to be sent to an email identified by the email stamp processing unit 230.

In this regard, the user may use the user interface to modify, add, delete or correct an email address before an email is sent. A user may therefore correct or update an email address identified by an email stamp, and information about the new email address may be stored within the printer so that future instance of the same email stamp result in the correct/updated email information being identified by the email stamp processing unit 230.

Thus, it will be understood that the printer 200 can be used with email paper or stationery comprising an email stamp so as to identify an email address of an intended and to send an email to the email address.

Figure 4:
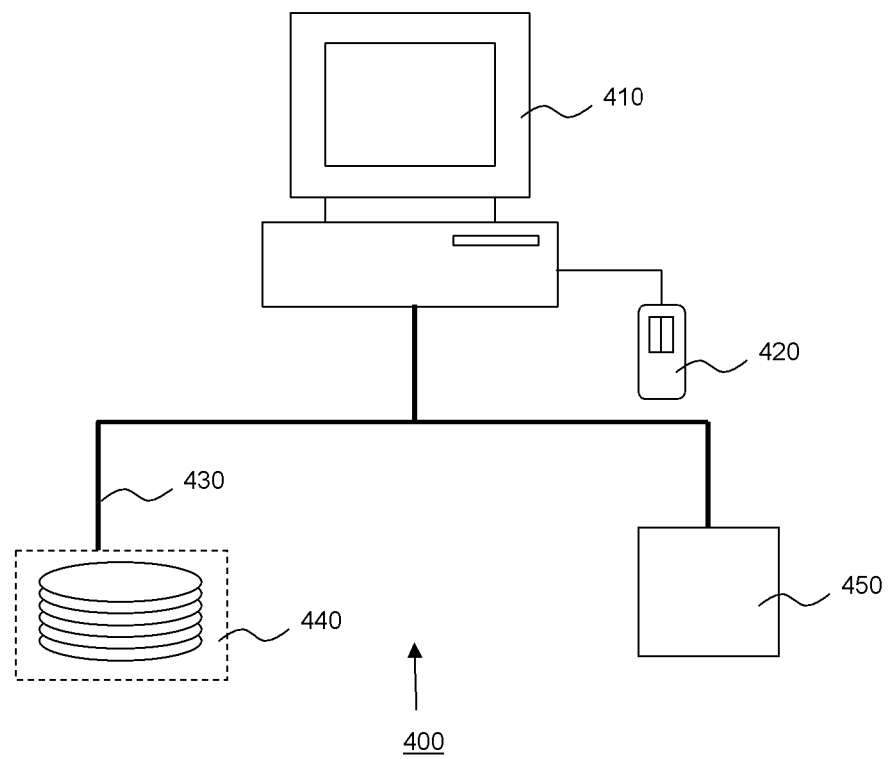
FIG. 4 shows a data processing system according to an embodiment.

Turning now to FIG. 4, a data processing system 400 in accordance with an embodiment is shown. A computer 410 has a processor (not shown) and a control terminal 420 such as a mouse and/or a keyboard, and has access to an electronic database stored on a collection 440 of one or more storage devices, e.g. hard-disks or other suitable storage devices, and has access to a further data storage device 450, e.g. a RAM or ROM memory, a hard-disk, and so on, which comprises the computer program product implementing at least part of a method according to an embodiment. The processor of the computer 410 is suitable to execute the computer program product implementing a method in accordance with an embodiment. The computer 410 may access the collection 440 of one or more storage devices and/or the further data storage device 450 in any suitable manner, e.g. through a network 430, which may be an intranet, the Internet, a peer-to-peer network or any other suitable network. In an embodiment, the further data storage device 450 is integrated in the computer 410.

It will be appreciated that embodiments provide advantages which can be summarized as follows:

The process of writing and sending an email can be simplified to writing a message on a piece of paper, pasting/sticking an email-stamp on the paper and taking a picture of the paper. This enables people who are not comfortable using email software, or people whose written language cannot be easily typed on a computer keyboard (like Chinese), to write and send email easily.

Email-stamp generation can be completed separately from email-stamp decoding. In this way, specific configuration of devices is not needed.

Embodiments may help to protect privacy by hiding a user's email address whilst still enabling the use to be sent an email.

Emails created using embodiments may be hand written. This, together with the ability to send email by scanning or taking a picture of a document makes the process of sending an email very convenient to a user.

Email-paper presents many flexible usage scenarios, catering for the individual needs and capabilities of users.

It should be noted that the above-mentioned embodiments are illustrative, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. Embodiments can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method for sending a document to an email address of a recipient, the method comprising:
    processing an electronic representation of the document in accordance with an optical recognition process so as to detect the presence of an email stamp in the electronic representation of the document;
    determining the email address represented by the detected email stamp;
    providing the determined email address to an email communication unit so as to instruct the email communication unit where to send an email;
    in which the email stamp comprises an image associated electronically with a number of email addresses of the recipient.

2. The method of claim 1, further comprising, prior to processing the electronic representation of the document,
    composing a message to be sent to a recipient as an email;
    generating an email stamp representing an email address of the recipient;
    combining the message and the email stamp so as to create a document for transmission; and
    generating an electronic representation of the document using image capturing means.

3. The method of claim 2, in which the image is a watermark.

4. The method of claim 1, in which a user associates electronically a number of email addresses of a recipient with the image previous to sending the document to the email address recipient.

5. A system for preparing an email to be sent to a recipient, comprising:
    a user interface to specify the recipient;
    a processor; and
    an email stamp generation unit to, with the processor, generate an email stamp representing an email address of the specified recipient;
    in which the email stamp, if processed in accordance with an optical recognition process, identifies the email address of the recipient to instruct an email communication unit where to send the email; and
    in which the email stamp comprises a watermark image comprising email address information embedded within the watermark image.

6. The system of claim 5, further comprising:
    an email stamp detection unit to process an electronic representation of the document in accordance with an optical recognition process so as to detect the presence of the email stamp in the electronic representation of the document, the email stamp representing an email address of the recipient; and
    an email stamp decoding unit to identify the email address represented by the detected email stamp, and to output the identified email address to an email communication unit so as to instruct the email communication unit where to send an email.

7. The system of claim 6, in which the email communication unit further comprises an image capture unit for capturing an image of a document comprising the email stamp.

8. The system of claim 5, further comprising a printer to print the email stamp.

9. The system of claim 8, wherein said printer outputs a pre-addressed item of stationery comprising the email stamp representing an email address of a recipient, wherein the email stamp is to be processed in accordance with an optical recognition process so as to identify the email address of the recipient and instruct the email communication unit where to send the email.

10. The system of claim 9, in which the pre-addressed item of stationary further comprises a message portion within which information to be sent to the recipient is to be provided.

11. A computer program product comprising a non-transitory computer-readable data storage medium storing instructions that are executed by a processor to:
    process an electronic representation of a document in accordance with an optical recognition process so as to detect the presence of an email stamp in the electronic representation of the document;
    determine the email address represented by the detected email stamp; and
    provide the determined email address to an email communication unit so as to instruct the email communication unit where to send an email,
    in which the email stamp comprises an image associated electronically with a number of email addresses of the recipient.

12. The computer program product of claim 11, arranged to, when executed by a processor:
    generate an email stamp representing an email address of a specified recipient,
    wherein the email stamp is to be processed in accordance with an optical recognition process so as to identify the email address of the recipient, and instruct an email communication unit where to send the email.

13. The computer program product of claim 12, arranged to, when executed by a processor, combine a message and the email stamp so as to create a document for transmission.

14. The computer program product of claim 11, in which the image is a watermark image and in which information regarding the email address is embedded in the watermark.

15. The computer program product of claim 11, further comprising instructions to, when executed by a processor, associate electronically a number of email addresses of a recipient with the image previous to sending the document to the email address recipient.

\* \* \* \* \*